United States Patent
Wilson, Jr.

(10) Patent No.: US 6,268,572 B1
(45) Date of Patent: Jul. 31, 2001

(54) PORTABLE WHEELCHAIR SCALE ADAPTOR PLATFORM

(76) Inventor: Alva C. Wilson, Jr., 5323 N. 32$^{nd}$ Pl., Phoenix, AZ (US) 85018

( * ) Notice: Subject to any disclaimer, the term of this patent is extended or adjusted under 35 U.S.C. 154(b) by 0 days.

(21) Appl. No.: 09/267,207

(22) Filed: Mar. 12, 1999

(51) Int. Cl.$^7$ .......... G01G 21/00; G01G 19/00; G01G 23/32; G01G 21/22

(52) U.S. Cl. .......... 177/126; 177/177; 177/262; 177/178

(58) Field of Search .......... 177/126, 128, 177/262, 263, 145, 177, 178

(56) References Cited

U.S. PATENT DOCUMENTS

| | | | |
|---|---|---|---|
| 1,830,050 | * 11/1931 | Carroll | 177/178 |
| 2,343,621 | * 3/1944 | Williams | 177/178 |
| 2,823,911 | * 2/1958 | Murphy | 177/126 |
| 2,860,868 | * 11/1958 | Wells | 177/126 |
| 3,630,299 | * 12/1971 | Albagli | 177/145 |
| 3,732,938 | * 5/1973 | Nelson | 177/126 |
| 4,126,197 | * 11/1978 | Kechely | 177/145 |
| 4,441,568 | * 4/1984 | Heffner | 177/262 |
| 4,534,365 | * 8/1985 | Bonetta et al. | 177/177 |
| 5,448,022 | * 9/1995 | Rishel | 177/126 |

\* cited by examiner

*Primary Examiner*—Randy W. Gibson
(74) *Attorney, Agent, or Firm*—Edward L. White

(57) ABSTRACT

The present invention is a wheelchair scale adapter comprising a substantially planar platform defining a cut out near a center and side walls and a rear wall respectively projecting upwardly therefrom, and having legs adjustably attached thereto for providing added stability, particularly when loading and unloading a wheelchair from the platform; an access ramp hingedly connected to the front of the platform for allowing a wheelchair-bound person to be wheeled onto the platform; a typical bathroom scale, etc., attached to the lower surface of the platform; the invention being adapted for weighing a wheelchair and an occupant which has been wheeled onto the platform. The invention also comprises a ramp mounted on the platform, and associated linkage, for causing the access ramp to rotate upwardly out of contact with a surface on which the invention rests, so as to give a more accurate reading of the weight of a person and wheelchair on the platform. Finally, the invention includes a viewing means for allowing a wheelchair-bound user to more easily see the weight readout on the scale.

3 Claims, 3 Drawing Sheets

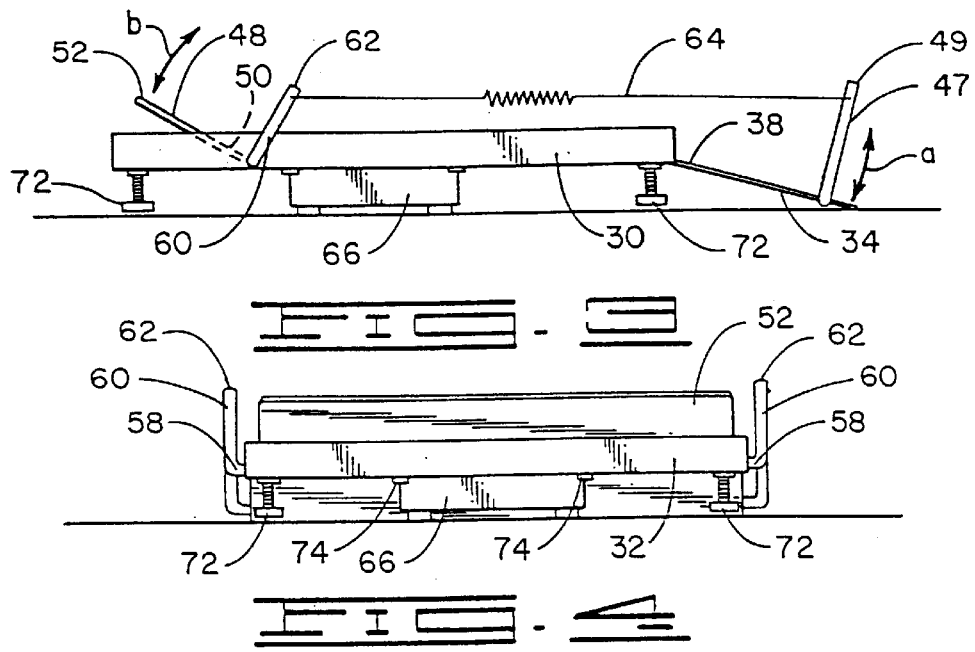
FIG. 3
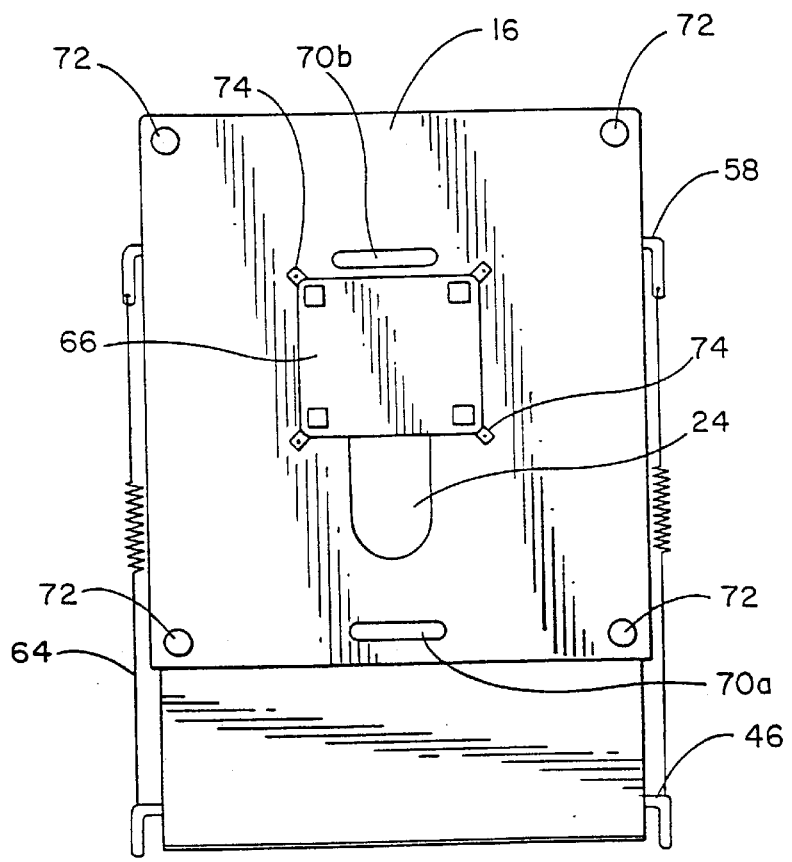
FIG. 4
FIG. 5

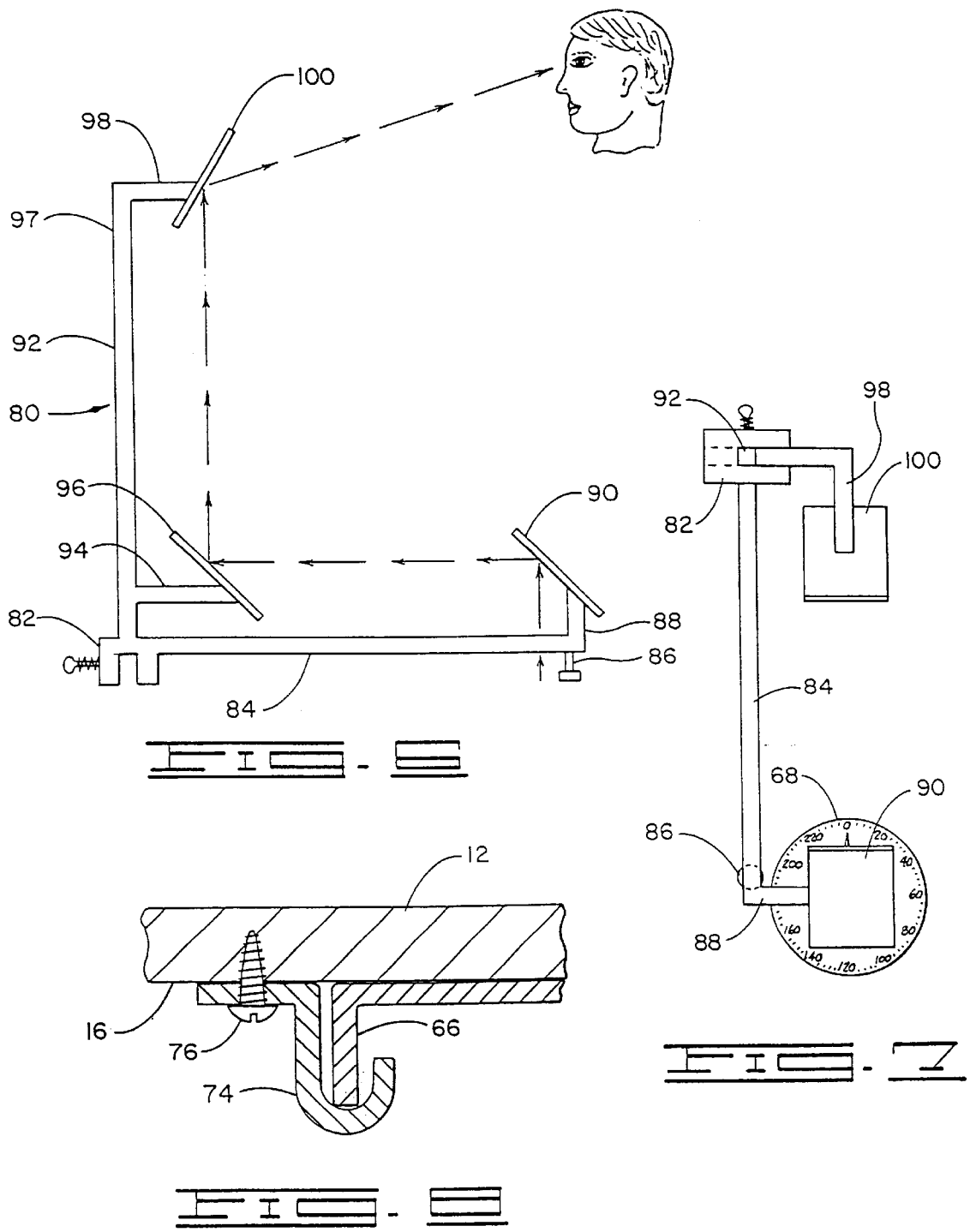

PORTABLE WHEELCHAIR SCALE ADAPTOR PLATFORM

CROSS REFERENCES TO RELATED APPLICATIONS

None.

BACKGROUND OF THE INVENTION a. Field of the Invention

The invention relates to devices for weighing objects. In particular, the invention relates to adaptors which allow a person in a wheelchair, with the aid of an assistant, to be weighed on a typical bathroom-type scale. The invention includes a portable wheelchair scale adaptor platform adapted to be received upon a typical bathroom scale, and an access ramp attached thereto to allow a wheelchair-bound person, with the aid of an assistant, to be rolled onto the platform thereby measuring his weight.

b. Description of the Prior Art

Numerous devices to allow a wheelchair-bound person to be weighed without removing them from their chair are known prior art. These devices are typified by U.S. Pat. No. 5,448,022 to Richel for a Tip-On Wheelchair Scale Adaptor, U.S. Pat. No. 4,126,197 to Kechely for a Weighing Ramp Adaptor, U.S. Pat. No. 3,30,299 to Albagli for a Platform Weighing Scale and Loading Adaptor therefor, and U.S. Pat. No. 3,732,938 to Nelson for a Wheelchair Weighing Platform. Richel's Tip-On Wheelchair Scale Adaptor cannot be used without assistance from someone other than the person in the wheelchair. The frame disclosed by Richel is first placed on the weighing scale. The wheelchair is then positioned in front of the lateral edge of the platform and the assistant tips the wheelchair backwardly to allow the front wheels of the wheelchair to pass over the platform. Once the front wheels of the wheelchair are over the platform, the wheelchair is tipped forward into its normal position which causes the lower frame member of the wheelchair to rest on the weighing platform. The wheelchair is thus held off the ground by the lower member of the wheelchair resting upon the weighing platform, and the person's weight can be recorded. The drawback with Richel, however, is two-fold; (1) a user in a wheelchair cannot weigh himself without assistance from another; and (2) the readout from the dial on the weighing scale is obscured by the wheelchair device itself so that the user in the wheelchair cannot see the readout of the weighing scale.

The device disclosed by Kechely is very simple. The device rests on the platform of the weighing scale, so that when a user places the front wheels of a wheelchair on the leading edge of the platform it tips forward presenting an angled surface onto which a user rolls the wheelchair. Once the user is all the way up on the platform, it angles back down to where it rests on the platform of the weighing scale. At that point, the weight of the patient can be noted. Again, the patent refers to use with an attendant of this device. The assistant to the person in the wheelchair tips the device so that the front edge is against the ground and the wheelchair can be rolled up onto the device. In addition, the assistant to the wheelchair-bound person would be the person to read the scale since the wheelchair-bound person could not see the readings of the scale. Another problem with Kechely is that older patients who are uncomfortable with unstable devices may be unwilling to wheel up the ramp for fear that their wheelchair will tip over backwards. The device wobbles substantially as the patient is wheeling himself onto the platform.

The same disadvantages apply to Nelson. None of these devices present a stable platform for a user to roll the wheelchair onto. The platform rests on the scale and tips and moves during operation. Wheelchair-bound patients, particularly older patients, may be uncomfortable with this tipping and unstable motion.

SUMMARY OF THE INVENTION

It is an object of the invention to provide a portable wheelchair adaptor platform which presents a stable surface for a wheelchair-bound person to be rolled onto with the aid of an assistant. It is a further object of the invention to provide a wheelchair scale adaptor which provides for easy viewing of the readout of the scale upon which the device is placed. Another object of the invention is to provide a device which can be used with most any manner of bathroom-type scales. There has been thus outlined, rather broadly, the more important features of the invention in order that the detailed description thereof that follows may be better understood, and in order that present contribution to the art may be better appreciated. There are, of course, additional features of the invention that will be described hereinafter which will form the subject matter of the claims appended hereto. In this respect, before explaining at least one embodiment of the invention in detail, it is to be better understood that the invention is not limited in this application to the details of construction and to the arrangements that components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate the conception, upon which the disclosure is based, may readily be utilized as a basis for the designing of other structures, methods and systems for carrying out the several purposes of the present invention. Additional benefits and advantages of the present invention will become apparent to those skilled in the art to which the present invention relates from the subsequent description of the preferred embodiment and the appended claims, taken in conjunction with the accompanying drawings. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with the patent or legal terms or phraseology, to determine quickly from a cursory inspection of the nature and essence of the technical disclosure of the application. The abstract is neither intended to define the invention of the application which is measured by the claims, nor is it intended to be limiting as to the scope of the invention in any way.

BRIEF DESCRIPTION OF THE DRAWINGS

FIG. 3 is a side view of the Wheelchair Scale Adaptor.

FIG. 4 is a rear view of the Wheelchair Scale Adaptor.

FIG. 5 is a bottom view of the Wheelchair Scale Adaptor.

FIG. 6 is a side view of an optional device intended to allow a user in a wheelchair to easily view the readout of the bathroom scale.

FIG. 7 is a top view of the optional device intended to allow a user to easily view the readout of the bathroom scale.

FIG. 8 is a detailed view of the means for attaching a scale to the platform.

DESCRIPTION OF PREFERRED EMBODIMENTS

Figure 1:
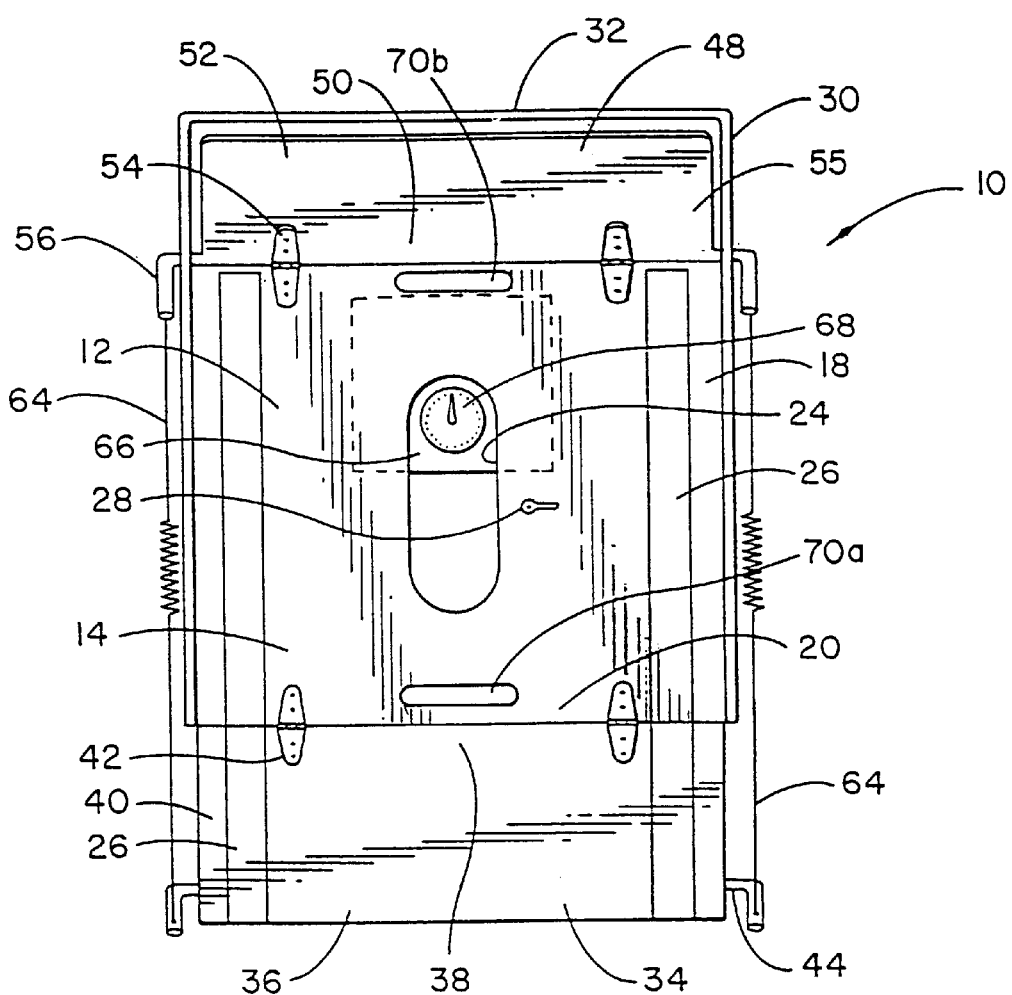
FIG. 1 is a top view of the Wheelchair Scale Adaptor.

Referring now to the drawings in detail, wherein like numerals represent like parts, an apparatus incorporating the principles of the present invention is generally illustrated in FIG. 1. The apparatus consists of a platform 12 comprised of substantially rigid material. The substantially rigid material could be selected from the group including wood, metals (including aluminum, steel, and other alloys), injection molded plastics, composite materials, such as fiberglass, and the like. Materials or construction are not critical to the invention, but preferably the platform 12 would be composed of a relatively light-weight material with good strength properties. The platform 12 has an upper surface 14 and a lower surface 16 illustrated in FIG. 5, showing the bottom of the Wheelchair Scale Adaptor. The platform 12 also has sides 18, a front 20, and a back 32. A cutout 24 is defined through the platform to allow a user space for hand calibration of the bathroom scale and to see the dial 68 of a scale 66 disposed underneath the platform. The hand holds 70a and 70b are defined through the platform 12 near its front 20 and back 22. The hand holds 70a and 70b allow a user to more easily grasp the platform 12 to move it. Guide strips 26 are disposed on the upper surface 14 of the platform 12. The guide strips 26 are disposed apart at a distance approximately equal to the distance between the wheels of a wheelchair whereby, with the aid of an assistant, the rear wheels of the wheelchair are aligned with the guide strips 26 before accessing ramp 34 and platform 12. Attached to the sides and back, on the upper surface of the platform, are side walls 30 and a rear wall 32. The side walls 30 and rear wall 32 serve as a safety function, preventing a user from rolling the wheels off the sides or back of the platform 12. The side walls can be seen in FIG. 3, side view of the Wheelchair Scale Adaptor, and the rear wall 32 can be seen in FIG. 4, a rear view of the Wheelchair Scale Adaptor 10.

An access ramp 34 is attached to the front 20 of the platform 12. The access ramp 34 has a lead edge 36, a rear edge 38, and sides 40. It is attached to the front 20 by hinges 42. The hinges 42 are attached to the front 20 and the rear edge 38 of the access ramp 34. The hinges 42 allow the access ramp 34 to pivot in relation to the upper surface 14. The access ramp 34 can pivot around so that it is in contact with the upper surface 14. When the access ramp 34 is in contact with the upper surface 14, latch 28 can be used to hold the access ramp 34 in place. The access ramp may be composed of any material noted for the platform. However, preferably the access ramp would be composed of a relatively stronger material than the platform. Preferably, the access ramp would be composed of a light-weight metal alloy.

A lifting ramp 48 is attached to the back 22 of the upper surface 14. The lifting ramp 48 is attached at a first edge 50 to hinges 54. A second edge 52 of the lifting ramp 48 can thus rotate toward the upper surface 14 or away therefrom. The lifting ramp can be composed of any material, but again it would preferably be composed of material similar to the access ramp 34.

On each side 40 of the lead edge 36 of the access ramp 34, a first L-shaped lifting lever 44 is attached. The first L-shaped lifting lever 44 extends outwardly from the sides 40. The first L-shaped lifting lever 44 is composed of a horizontal portion 46, a vertical portion 47, and a distal end 50. The horizontal portion is parallel to the access ramp 34. The vertical portion extends substantially perpendicular to the a plain created by the access ramp 34. A second L-shaped lifting lever 56 is attached at either side 55 of the lifting ramp 48. As with the first L-shaped lifting lever 44, the second L-shaped lifting lever 56 is composed of a horizontal portion 58, a vertical portion 60, and a distal end 62. The horizontal portion 58 runs parallel to the lifting ramp 48. The vertical portion 60 runs substantially perpendicular to the lifting ramp 48. A flexible connection means 64 is attached between the distal end 50 of the first L-shaped lifting lever 44, and the distal end 62 of the second L-shaped lifting lever 56 parallel to the sides 18 of the platform 12. FIG. 1, FIG. 3, and FIG. 5, viewed in conjunction, best illustrate the cooperation of the first L-shaped lifting lever 44, the second L-shaped lifting lever 56, and the flexible connection means 64.

Figure 2:
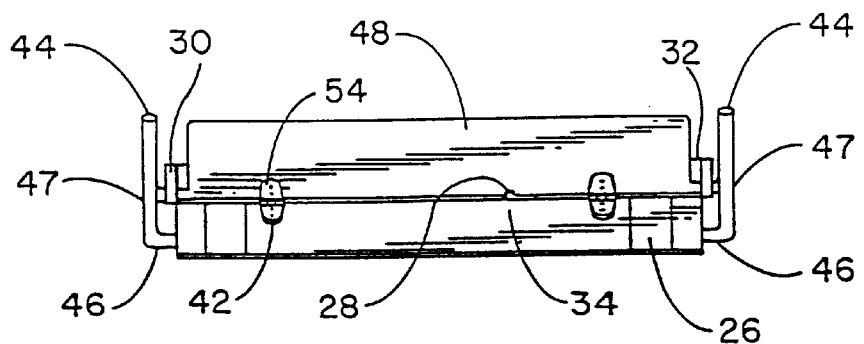
FIG. 2 is a front view of the Wheelchair Scale Adaptor.

FIG. 2 illustrates the sloped surface presented by the access ramp 34 and which is further illustrated in FIG. 3. From the front 20 of the platform 12, the access ramp 34 slopes downwardly toward a support surface.

The attachment of the scale 66 to the platform 12 is illustrated in FIG. 4 and FIG. 5. The scale 66, to which the platform 12 is to be mounted, is centered under the cutout 24, so that the dial 68 on the scale 66 is visible from above. The attachment means 74, are then attached to the scale 66 and the lower surface 16 of the platform 12. FIG. 8 details one possible means for attaching the scale 66 to the platform 12. In FIG. 8, an attachment bracket 74 hooks to the edge of the scale 66. A mounting attachment screw 76 is then drilled into the platform 12 to hold the bracket 74 in place. In FIG. 5, several of these brackets 74 are attached to the scale, at each corner of the scale, to hold it in place. An adjustable leg 72 is attached to the lower surface 16 at each corner of the platform 12. The adjustable legs 72, preferably are threaded so that they can be extremely adjusted into a bolt mounted to the lower surface 16 of the platform. This allows the user to account for the height of the scale 66 attached to the platform 12.

FIG. 6 and FIG. 7 illustrate an alternative device which allows a user in a wheelchair to view the dial 68 of the scale 66 while still seated in his wheelchair. The viewing apparatus 80 is attached to the rear wall 32. The attachment means 82 is clamped onto the real wall 32 to hold the viewing apparatus 80 in place. Preferably, the viewing apparatus 80 is centered between the two sides 18 of the platform 12. A horizontal member 84 runs perpendicular to the rear wall toward the dial 68, viewable through the cutout 24. A support leg 86 is disposed at an end of the horizontal member to hold it in place or give it support. A first mirror support member 88 extends perpendicular to the horizontal member 84. The first mirror support member 88 holds a first mirror 90 at a fixed angle relative to the platform 12. A mirror adjustment means (not shown) is disposed between the first mirror support member 80 and the first mirror 90. The adjustment means allows a user to adjust the angle and position of the mirror 90. A vertical member 92 extends vertically above the attachment means 82. Attached to the vertical member 92, just above the attachment means 82, is a second mirror support member 94. The second mirror support member is attached to a second mirror 96. Similar to the first mirror support member 88 and first mirror 90, an adjustment means (not shown) is disposed between the second mirror support member and the second mirror. The second adjustment means allows the user to adjust the angle and position of the second mirror. At the top 97 of the vertical member 92, the third mirror support member 98 is attached. The third mirror support member supports a third mirror. Again, an adjustment means (not shown) is disposed between the third mirror support member and the mirror. This allows the user to adjust the angle and position of the third mirror. In cooperation, the first, second, and third mirrors 90, 96, and 100, cooperate to allow a user to see the dial 68 of the scale 66. As shown in FIG. 7, light from the dial 68 is reflected off the first mirror 90 to the second mirror 96, thence to the third mirror 100, and finally to the eye of the user. The mirror adjustment means can be set so that the user can easily see the dial 68 without discomfort or undue effort.

In operation, a wheelchair-bound person is rolled by an assistant onto the platform. The guide strips 26 aid the assistant in correctly aligning the rear wheels of the wheelchair before accessing the ramp 34. The side and rear walls 30 and 32 prevent the user from accidentally rolling off of the platform. If the viewing apparatus is in place, the user can read the scale himself, then deduct the known weight of the wheelchair to determine his weight. Otherwise, the assistant will have to read the scale. Here again, for safety reasons, it is mandatory that there be an assistant to help the user get off of the platform.

Thus having described the field of the invention, the prior art, the attached drawings, the summary of the invention, and the detailed description of the preferred embodiments, I claim:

1. A wheelchair scale adapter platform comprising:
   a. a platform having upper and lower surfaces, front and a back, sides, and defining a cut out near a center and further defining at least one cut out near each of the front and back sides, the upper surface having guide strips placed thereon at approximately the same distance apart as a pair of wheelchair wheels, the sides and back having side walls and a rear wall respectively projecting upwardly therefrom, the lower surface further having legs adjustably attached thereto for providing added stability;
   b. an access ramp having a lead edge, a rear edge, and hinges rotatably connecting the rear edge to the front of the platform;
   c. a scale attached to the lower surface of the platform, adapted for weighing a wheelchair and an occupant which has been wheeled onto the platform;
   d. a lifting ramp having a first edge, and hinges adapted to rotatably connect the first edge to the back of the upper surface;
   e. a first L-shaped lifting lever attached to the lifting ramp, the L-shaped lifting lever having a horizontal portion, a vertical portion, and a distal end;
   f. a second L-shaped lifting lever attached to the access ramp, the second L-shaped lifting lever having a horizontal portion, a vertical portion, and a distal end; and
   g. a flexible connection means attached at one end to the distal end of the first L-shaped lifting lever, and at another end to the distal end of the second L-shaped lifting lever,
whereby the access ramp is lifted upwardly off the ground when a user's wheelchair rolls up onto the ramp and the front wheels of the wheelchair roll onto the lifting ramp causing the first L-shaped lifting lever to rotate, which in turn pulls the second L-shaped lifting lever, lifting the access ramp and providing a more accurate measurement of the user's weight.

2. The wheelchair scale adapter platform of claim 1, further comprising a latch disposed on the upper surface of the platform so that when the access ramp is rotated into contact with the upper surface, the latch holds the access ramp in place.

3. A wheelchair scale adapter platform comprising:
   a. a platform having upper and lower surfaces, front and a back, sides, and defining a cut out near a center and further defining at least one cut out near each of the front and back sides, the upper surface having guide strips placed thereon at approximately the same distance apart as a pair of wheelchair wheels, the sides and back having side walls and a rear wall respectively projecting upwardly therefrom, the lower surface further having legs adjustably attached thereto for providing added stability;
   b. an access ramp having a lead edge, a rear edge, and hinges rotatably connecting the rear edge to the front of the platform;
   c. a scale attached to the lower surface of the platform, adapted for weighing a wheelchair and an occupant which has been wheeled onto the platform;
   d. a lifting ramp having a first edge, and hinges adapted to rotatably connect the first edge to the back of the upper surface;
   e. a first L-shaped lifting lever attached to the lifting ramp, the L-shaped lifting lever having a horizontal portion, a vertical portion, and a distal end;
   f. a second L-shaped lifting lever attached to the access ramp, the second L-shaped lifting lever having a horizontal portion, a vertical portion, and a distal end; and
   g. a flexible connection means attached at one end to the distal end of the first L-shaped lifting lever, and at another end to the distal end of the second L-shaped lifting lever,
   h. a viewing apparatus having an attachment means adapted to releasably engage either the rear or sidewall;
   i. a horizontal member having a distal end with support leg attached, having a first support member attached thereto for support and first mirror attached thereto by a means for adjusting the mirror; and
   j. a vertical member attached to the horizontal member having a distal end, the vertical member having a second mirror support member attached thereto adjacent to the attachment means, a second mirror attached to the second mirror support member with a means for adjusting the mirror, and a third mirror support member attached to the distal end of the vertical member, the third mirror support member having a third mirror attached thereto via a means for adjustment of the mirror, whereby a user in a wheelchair can easily see the scale, which would otherwise be obscured beneath the user's chair.

* * * * *